Dec. 6, 1927.
M. S. PARK
1,651,540
AUTOMOBILE SIGNAL APPARATUS
Filed April 10, 1922
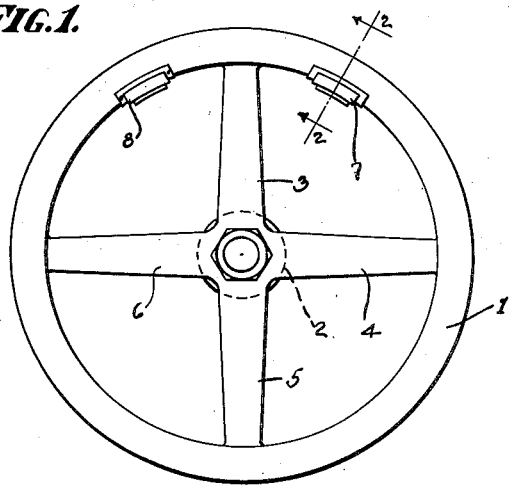
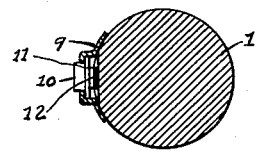
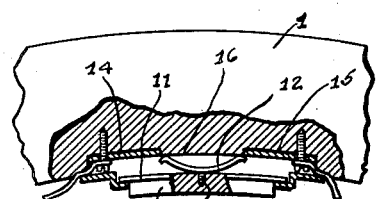
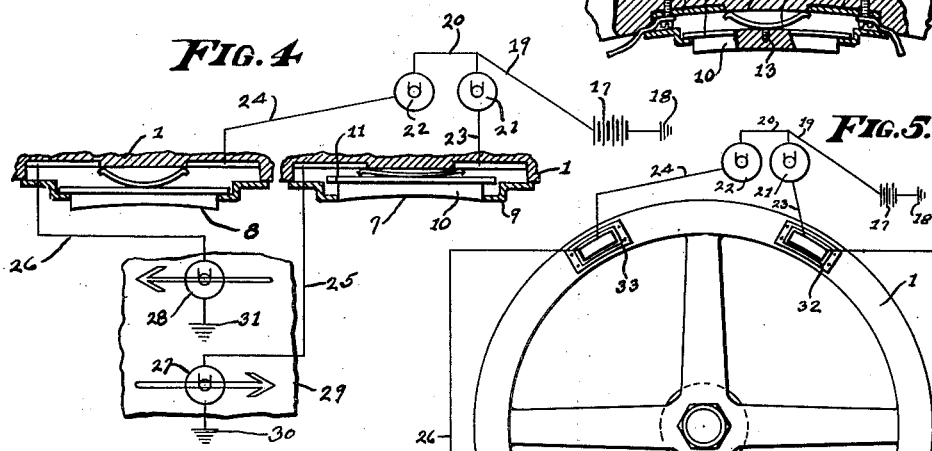
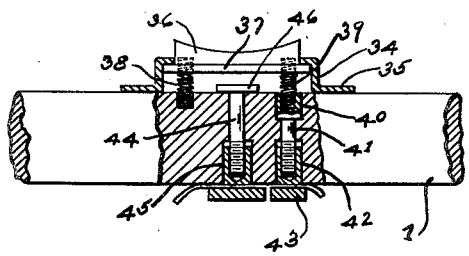
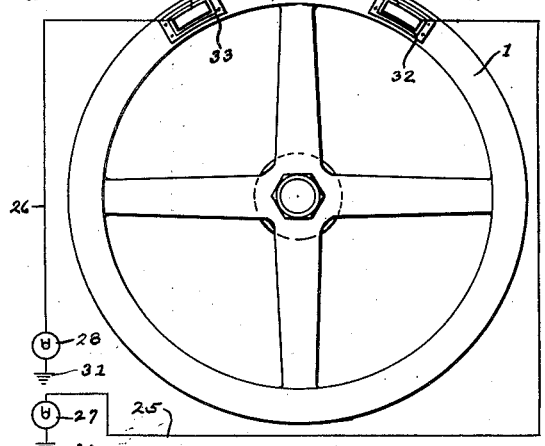
Maurice S. Park
INVENTOR.
BY
Erwin, Wheeler & Woolard
ATTORNEYS.

Patented Dec. 6, 1927.

1,651,540

UNITED STATES PATENT OFFICE.

MAURICE S. PARK, OF MADISON, WISCONSIN.

AUTOMOBILE SIGNAL APPARATUS.

Application filed April 10, 1922. Serial No. 551,236.

This invention relates to automobile signal apparatus, and is particularly directed to the control switches for the turning signal of automobiles.

Objects of this invention are to provide control switches for turning signals so associated with the steering wheel that the switches will be closed by the thumbs of the operator when he manipulates the steering wheel in the customary manner to make a right or left hand turn; to so mount these switches upon the steering wheel that the driver can always reach the appropriate switch with his thumb when making the desired turn; and to provide a simple, and compact switch which will not mar the appearance of the steering wheel.

Embodiments of the invention are shown in the accompanying drawings, in which:

Fig. 1 is a plan view of a steering wheel with the switches applied thereto.

Fig. 2 is a sectional view taken on the line 2—2 of Fig. 1.

Fig. 3 is a fragmentary detail view partly in section, the sectional showing being at right angles to that of Fig. 2.

Fig. 4 is a diagrammatic view showing the switches connected electrically with the controlled lights.

Fig. 5 is a view of a modified form, such figure corresponding to Fig. 1.

Fig. 6 is a fragmentary view partly in section, showing details of the modified form.

Figs. 1 to 4 will first be described. The steering wheel is provided with a wooden rim 1 connected with the central hub 2 by a plurality of spokes 3, 4, 5 and 6. It is preferred in employing this invention upon automobiles to so adjust the steering wheel that one of the spokes 3 extends directly forwardly when the wheel is in neutral position.

It is well known that when a driver makes a right hand turn, he usually moves his right hand along the rim of the wheel and catches it more nearly at its central forward portion; and in the same manner for a left hand turn, he usually grips the steering wheel with his left hand at a point closely adjacent the central forward portion and slightly to the left thereof. In order to permit this usual operation and at the same time to place the signal lights under the control of the hand of the operator customarily used for the particular turn, the right and left hand switches indicated generally at 7 and 8 are placed respectively upon the right and left hand sides of the central forward portion of the steering wheel rim and in the form shown in Fig. 1 upon the inner side thereof. It will be seen, therefore, that these switches are placed where the hand of the operator naturally will fall upon them without any conscious effort on his part when he is attempting to make the desired turn. In this manner, a voluntary or conscious effort on the part of the operator is not required in order to light the desired indicating signal.

These switches may comprise an external guiding casing or face plate 9 which is secured to the wooden portion of the rim 1 and is provided with a central aperture. Through this aperture, a thumb piece 10 projects. The inner face of thumb piece is provided with a flange 11 which, as will be seen from the left hand switch in Fig. 4, sets or bears against the inner surface of the face plate or guiding sheath 9 and prevents the thumb piece from passing outwardly therefrom. A U-shaped spring 12 is secured at its central portion as by means of a screw 13 to the inner face of the thumb piece, and normally has its opposite ends resting upon the insulating or wooden portion of the steering wheel rim as indicated in Fig. 3. This steering wheel rim is recessed and a pair of contact members 14 and 15 are seated within this recess and are separated by a slightly elevated portion 16 of the rim. Upon this elevated portion 16, the ends of the spring 12 rest under normal conditions. When, however, the thumb piece is pressed inwardly the spring 12 flattens out and electrically connects the contacts 14 and 15 as will be seen from the right hand switch in Fig. 4.

The battery 17 is connected at one end to a ground 18 and at its other end, by means of wires 19 and 20, to telltales or small lights 21 and 22 mounted upon the dash of the automobile. From these lights, wires 23 and 24 extend to one of the contact members of each of the right and left hand thumb switches respectively. The other contact plate of the right and left hand switches are respectively connected by wires 25 and 26 with the right and left hand lamps 27 and 28 mounted in the signal apparatus 29. The other side of these lamps is grounded as indicated respectively at 30 and 31.

It will be seen from the apparatus thus far described that when the operator attempts to make a right hand turn the right hand switch will be automatically closed by the operator's gripping the rim 1 of the steering wheel in the usual manner without any conscious thought on his part, and accordingly the right hand signal lamp will be lighted. This lighting of the lamp will, therefore, occur in advance of even the beginning of the actual turning of the machine and, as pointed out above, without any voluntary effort on the part of the operator.

Figs. 5 and 6, showing a modified form of the invention, will now be described. The right and left hand switches 32 and 33 are mounted with reference to the forward central portion of the steering wheel, in substantially the same positions as are the corresponding switches illustrated in Fig. 1. However, these switches are mounted upon the upper side of the steering wheel rim 1 as may be seen from Fig. 5. The electrical circuits controlled by these switches are identically the same as those previously described, and will not, therefore, be described in detail.

The detail of these switches is shown in Fig. 6 in which it will be seen that the face plate or guiding sheath 34 is provided with outwardly directed flanges 35 which are secured to the upper face of the rim 1. A thumb piece 36 projects outwardly through an aperture in this sheath and is provided with an inner flange 37. A pair of helical springs 38 and 39 are socketed within the thumb piece at one end and within a portion of the rim 1 at the other end. One of the springs 39 is preferably socketed within an enlarged end 40 of a metallic screw 41. The screw 41 is held in place by means of a nut 42 which engages the outer threaded end of the screw 41 and projects outwardly upon the lower side of the steering rim 1. It may be provided with an enlarged head 43 beneath which the end of the appropriate wire of the electrical system is engaged. A second headed screw 44 is substantially centrally positioned, with respect to the switch, and has its threaded lower end engaged by a similar nut 45 as indicated in Fig. 6. It will be seen, therefore, that when the thumb piece 36 is pressed downwardly, the metallic flange portion 37 connects the nuts 42 and 45 through the medium of the helical spring 39 and the enlarged head 46 of the screw 44. If desired, the thumb pieces in both forms of switches may be made of insulated material and the flange 37 in the form shown in Fig. 6 may be made of metal or, as an alternate construction, the entire thumb piece, including the projecting portion and the flange, may be made of metal.

It is understood, of course, that either type of switch may be employed either upon the inner side or upper side of the steering wheel. It is, however, imperative that these switches be located in approximately the position shown with respect to the central forward portion of the rim so that they may be closed automatically without conscious thought of the operator.

I claim:

1. The combination with the steering wheel of a motor vehicle, of signaling means adapted respectively to indicate right and left hand turns, and operating connections for said signaling means including manually operable elements disposed on said steering wheel in positions adjacent the normal outer central portion thereof where such elements are not within reach of the operator's hand under normal circumstances and are so disposed that when the operator extends his right or left hand preparatory to rotating the wheel for a right or left hand turn, such hand will engage and operate the element connected to the proper signal to indicate the contemplated turn without conscious effort on the part of the operator.

2. The combination with the steering wheel of a motor vehicle, of a pair of signal controlling switches having operating means positioned adjacent to and upon opposite sides of the normal outer central portion of the steering wheel and so positioned as to fall naturally beneath the right and left hands of the operator respectively as he reaches forward around the wheel preparatory to making a right or left hand turn, and electrically operable signal means connected to said switches for indicating the direction the vehicle is to be turned.

3. An automobile signal comprising signaling means for indicating a change in the direction of travel of the automobile, steering mechanism, and means adapted to be operated by a driver on grasping the rim of the steering wheel adjacent the forward portion thereof at one side of the normal central point of the rim preparatory to the turning of said wheel to turn the automobile for operating said signaling means to give a corresponding turn indication.

4. An automobile signal comprising signaling means for indicating changes in the direction of travel of the automobile, steering mechanism, and means adapted to be operated by a driver on grasping the rim of the wheel adjacent the forward portion thereof at the right and left sides of the normal central point of the rim preparatory to turning said wheel to turn the automobile to the right or left respectively for operating said signaling means to give the respective turn indication.

5. An automobile signal comprising electrical signaling means for indicating a change in the direction of travel of the automobile, a circuit therefor, a switch in said circuit, steering mechanism and operating means for said switch adapted to be operated by a driver on grasping the rim of the wheel adjacent to the forward portion thereof at one side of the normal central point of the rim preparatory to turning said wheel to turn the automobile for closing the circuit to said signal to give a corresponding turn indication.

MAURICE S. PARK.